US009824553B2

(12) United States Patent
Zhai et al.

(10) Patent No.: US 9,824,553 B2
(45) Date of Patent: Nov. 21, 2017

(54) DISTANCE DETECTION SYSTEM, VIBRATION PROMPT CIRCUIT AND VIBRATION PROMPT METHOD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Kai-Le Zhai, Wuhan (CN); Chun-Sheng Chen, New Taipei (TW)

(73) Assignees: HONG FU JIN PRECISION INDUSTRY (WuHan) Co., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 275 days.

(21) Appl. No.: 14/716,626

(22) Filed: May 19, 2015

(65) Prior Publication Data
US 2016/0314671 A1  Oct. 27, 2016

(30) Foreign Application Priority Data

Apr. 27, 2015 (CN) .......................... 2015 1 0204022

(51) Int. Cl.
*G08B 6/00* (2006.01)
*G01B 21/16* (2006.01)

(52) U.S. Cl.
CPC .............. *G08B 6/00* (2013.01); *G01B 21/16* (2013.01)

(58) Field of Classification Search
None
See application file for complete search history.

(56) References Cited

U.S. PATENT DOCUMENTS

| | | | | |
|---|---|---|---|---|
| 2008/0068187 | A1* | 3/2008 | Bonefas | G06T 7/0004 340/575 |
| 2012/0293330 | A1* | 11/2012 | Grant | G08B 13/1427 340/568.8 |
| 2013/0201240 | A1* | 8/2013 | Kodama | H05K 3/125 347/14 |
| 2015/0160071 | A1* | 6/2015 | Kadosawa | G01H 11/08 73/658 |
| 2015/0195645 | A1* | 7/2015 | Lee | H04R 1/46 381/151 |
| 2017/0048691 | A1* | 2/2017 | Liu | A24F 47/00 |

* cited by examiner

*Primary Examiner* — Laura Nguyen
(74) *Attorney, Agent, or Firm* — Steven Reiss

(57) ABSTRACT

A distance detection system in an electronic device includes a vibration prompt circuit and a prompt module. The vibration prompt circuit includes a distance sensor, a processor, and a comparison module. The distance sensor is coupled to the processor. The processor is coupled to the comparison module. The comparison module is coupled to the prompt module. The distance sensor sends a distance value as to the distance between itself and a detected object to the processor. The processor converts the distance value to a current value and the current value is compared with a reference value. The prompt module activates a vibration device if the current value is greater than the reference value. A vibration prompt circuit and a vibration prompt method are also provided.

18 Claims, 5 Drawing Sheets

DISTANCE DETECTION SYSTEM, VIBRATION PROMPT CIRCUIT AND VIBRATION PROMPT METHOD

FIELD

The subject matter herein generally relates to dynamic distance measurement.

BACKGROUND

A distance detection system may be used in an electronic device to detect a distance between a detected object and a reference object.

BRIEF DESCRIPTION OF THE DRAWINGS

Implementations of the present technology will now be described, by way of example only, with reference to the attached figures.

DETAILED DESCRIPTION

Figure 1:
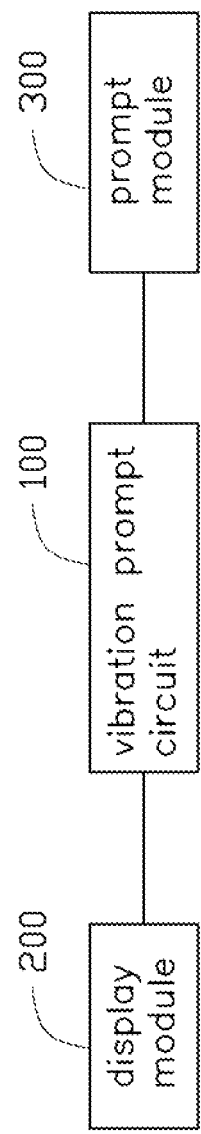
FIG. 1 is a block diagram of one embodiment of a distance detection system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series, and the like.

The present disclosure is described in relation to a vibration prompt circuit and a vibration prompt method.

Figure 2:
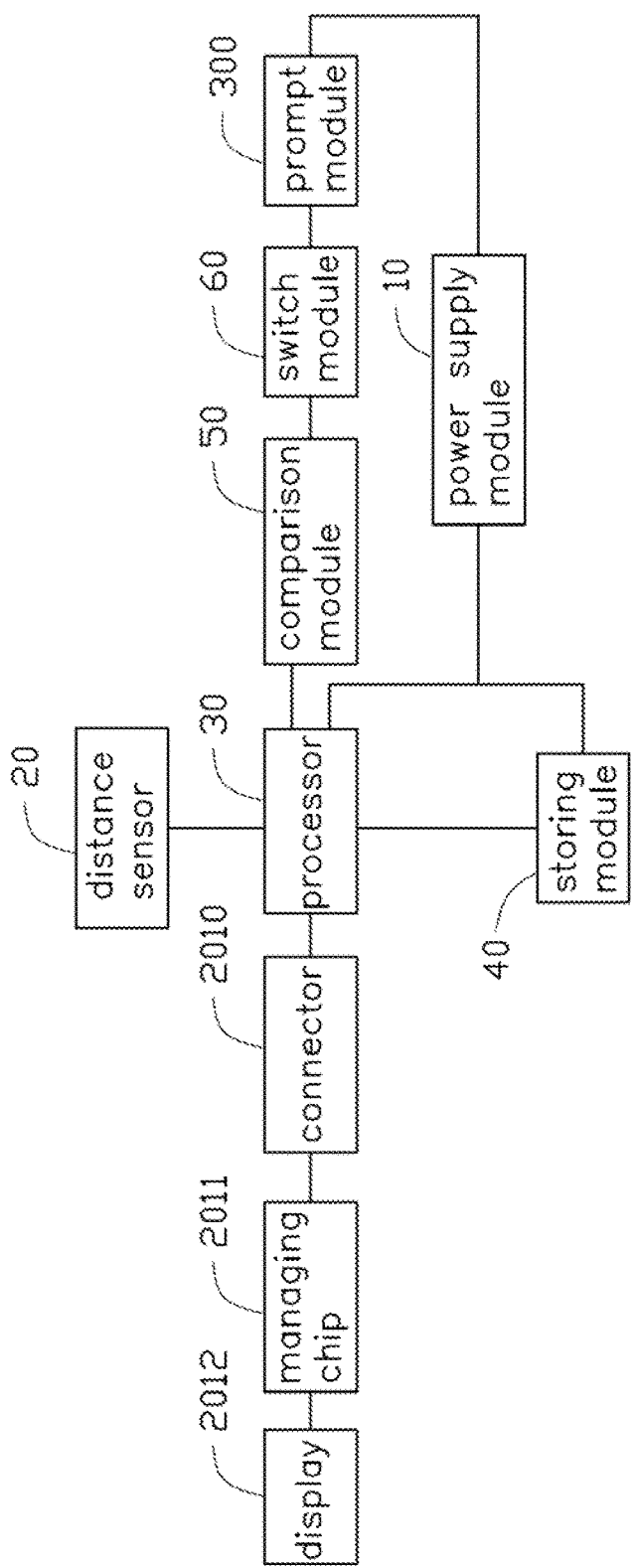
FIG. 2 is similar to FIG. 1, but shows a block diagram of a vibration prompt circuit and a display module of the distance detection system of FIG. 1.

FIGS. 1 and 2 illustrate an embodiment of a distance detection system. The distance detection system comprises a vibration prompt circuit 100, a display module 200, and a prompt module 300. The vibration prompt circuit 100 comprises a power supply module 10, a distance sensor 20, a processor 30, a storing module 40, a comparison module 50, and a switch module 60. The display module 200 comprises a connector 2010, a managing chip 2011, and a display 2012.

The display 2012 is coupled to the managing chip 2011. The managing chip 2011 is coupled to the processor 30 via the connector 2010. The processor 30 is coupled to the distance sensor 20, the storing module 40, and the comparison module 50. The comparison module 50 is coupled to the switch module 60. The switch module 60 is coupled to the prompt module 300. The power supply module 10 is coupled to the processor 30, the storing module 40, and the prompt module 300. The power supply module 10 is configured to supply power to the processor 30, the storing module 40, and the prompt module 300.

The distance sensor 20 is configured to detect a detected object (not shown) and sense a distance to the detected object and generate a distance signal according to a distance between the detected object and the distance sensor 20. The distance sensor 20 is further configured to convert the distance signal to a distance value and send the distance value to the processor 30. The processor 30 is configured to convert the distance value to a current value. The processor 30 is also configured to write the current value and a predetermined value to the storing module 40. The processor 30 is also configured to read the current value and the predetermined value from the storing module 40. The processor 30 is further configured to determine whether the current value is greater than the predetermined value, and output prompt information to the display 2012 if and when the current value is greater than the predetermined value. The display 2012 is configured to display the prompt information. The comparison module 50 is configured to compare the current value with a reference value. The comparison module 50 is also configured to output a first control signal if the current value is greater than the reference value and output a second control signal if the current value is not greater than the reference value. The switch module 60 is configured to be switched on upon receiving the first control signal and be switched off upon receiving the second control signal. The prompt module 300 is configured to activate a vibration device when the switch module 60 is switched on and not to activate the vibration device when the switch module 60 is switched off. In one embodiment, the first control signal is a high level signal and the second control signal is a low level signal.

In one embodiment, the distance detection system can be used in a working situation at a table. A user can be using a computer and the distance sensor 20 generates a distance signal after sensing a distance between the user and a calibrated reference position. The distance sensor 20 converts the distance signal to a distance value. The distance sensor 20 sends the distance value to the processor 30. The processor 30 converts the distance value to a current value after receiving the distance value. The processor 30 sends the current value to the comparison module 50. The comparison module 50 compares the current value with a reference value. The comparison module 50 outputs a first control signal when the current value is greater than the reference value. The switch module 60 is switched on upon receiving the first control signal. The first motor 301 and the second motor 302 vibrate when the switch module 60 is switched on. The user can sense the vibration of the first motor 301 and the second motor 302. The display 2012 displays information as to correct posture, when the body of the user slouches forward for example towards the computer.

In one embodiment, the managing chip 2011 is a platform controller hub (PCH) chip, the storing module 40 is a ROM memory, the switch module 60 is a field effect transistor (FET), and the FET comprises a control terminal G, a first connecting terminal S, and a second connecting terminal D.

Figure 3:
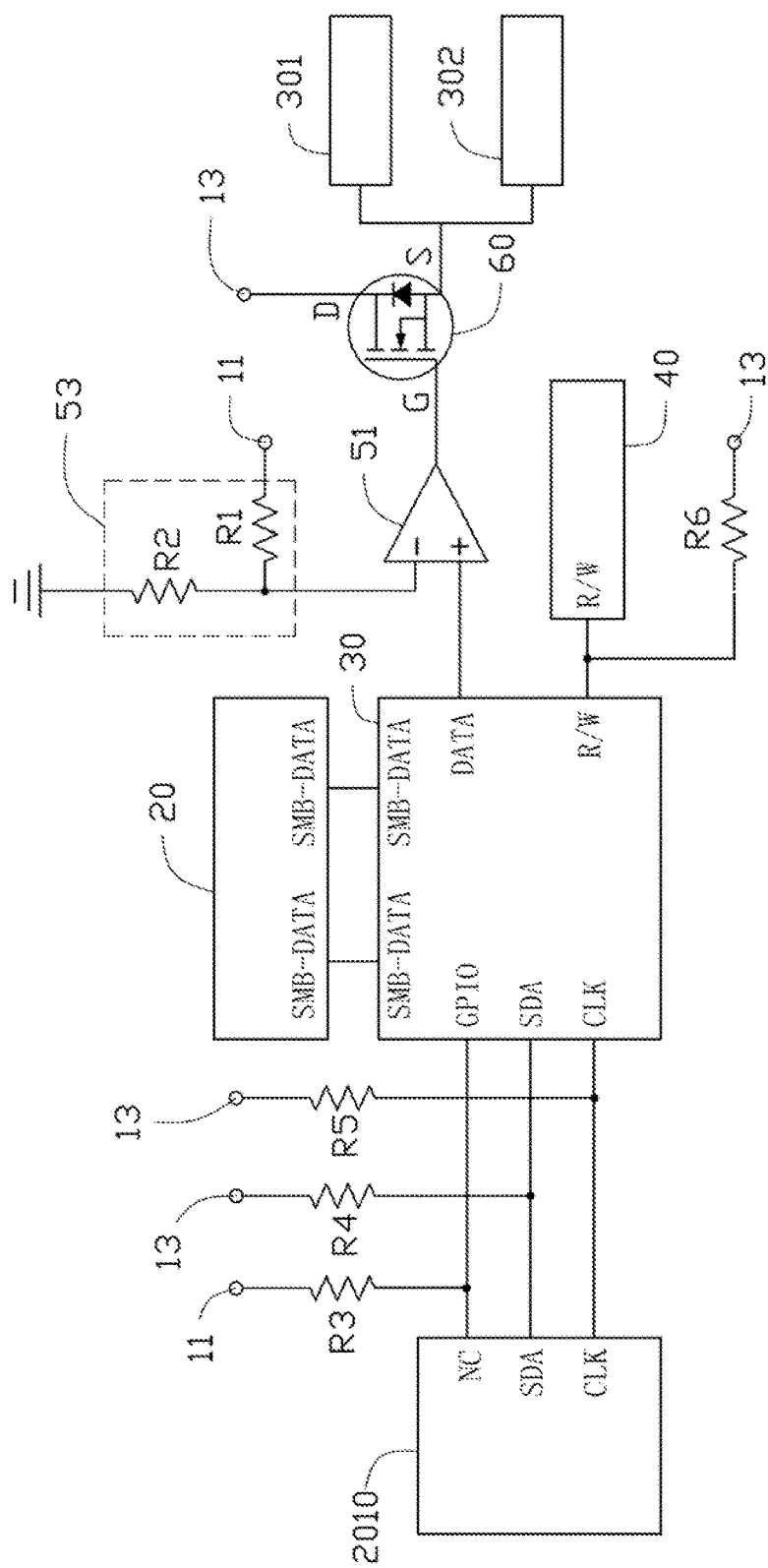
FIG. 3 is a circuit diagram of one embodiment of the distance detection system.

FIG. 3 illustrates that the power supply module 10 comprises a first power supply 11 and a second power supply 13. In one embodiment, the first power supply 11 is configured to provide a 5V voltage and the second power supply 13 is configured to provide a 3.3V voltage.

The processor 30 comprises a base input/output pin GPIO, a first clock pin CLK, a second clock pin SMB_CLK, a data information pin SDA, a first data pin DATA, a second data pin SMB_DATA, and a reading/writing pin R/W.

The comparison module 50 comprises a comparator 51 and a reference circuit 53. The reference circuit 53 comprises a first resistor R1 and a second resistor R2.

The prompt module 300 comprises a first motor 301 and a second motor 302.

A null pin NC of the connector 2010 is coupled to the base input/output pin GPIO of the processor 30. The base input/output pin GPIO of the processor 30 is coupled to the first power supply 11 via a third resistor R3. A data information pin SDA of the connector 2010 is coupled to the data information pin SDA of the processor 30. A clock pin CLK of the connector 2010 is coupled to the first clock pin CLK of the processor 30. The data information pin SDA of the processor 30 is coupled to the second power supply 13 via a fourth resistor R4. The first clock pin CLK processor 30 is coupled to the second power supply 13 via a fifth resistor R5. The first data pin DATA of the processor 30 is coupled to a positive input end (not labeled) of the comparator 51. The second clock pin SMB_CLK of the processor 30 is coupled to a clock pin SMB_CLK of the distance sensor 20. The second data pin SMB_DATA of the processor 30 is coupled to a data pin SMB_DATA of the distance sensor 20. The reading/writing pin R/W of the processor 30 is coupled to a reading/writing pin R/W of the storing module 40. The reading/writing pin R/W of the processor 30 is coupled to the second power supply 13 via a sixth resistor R6

The first power supply 11 is coupled to one end of the first resistor R1. The other end of the first resistor R1 is coupled to one end of the second resistor R2. The other end of the second resistor R2 is grounded. A node (not labeled) between the first resistor R1 and the second resistor R2 is coupled to a reverse input end (not labeled) of the comparator 51. An output end of the comparator 51 is coupled to the control terminal G of the FET. The first connecting terminal S of the FET is coupled to the first motor 301 and the second motor 302. The second connecting terminal D of the FET is coupled to the second power supply 13.

Figure 4:
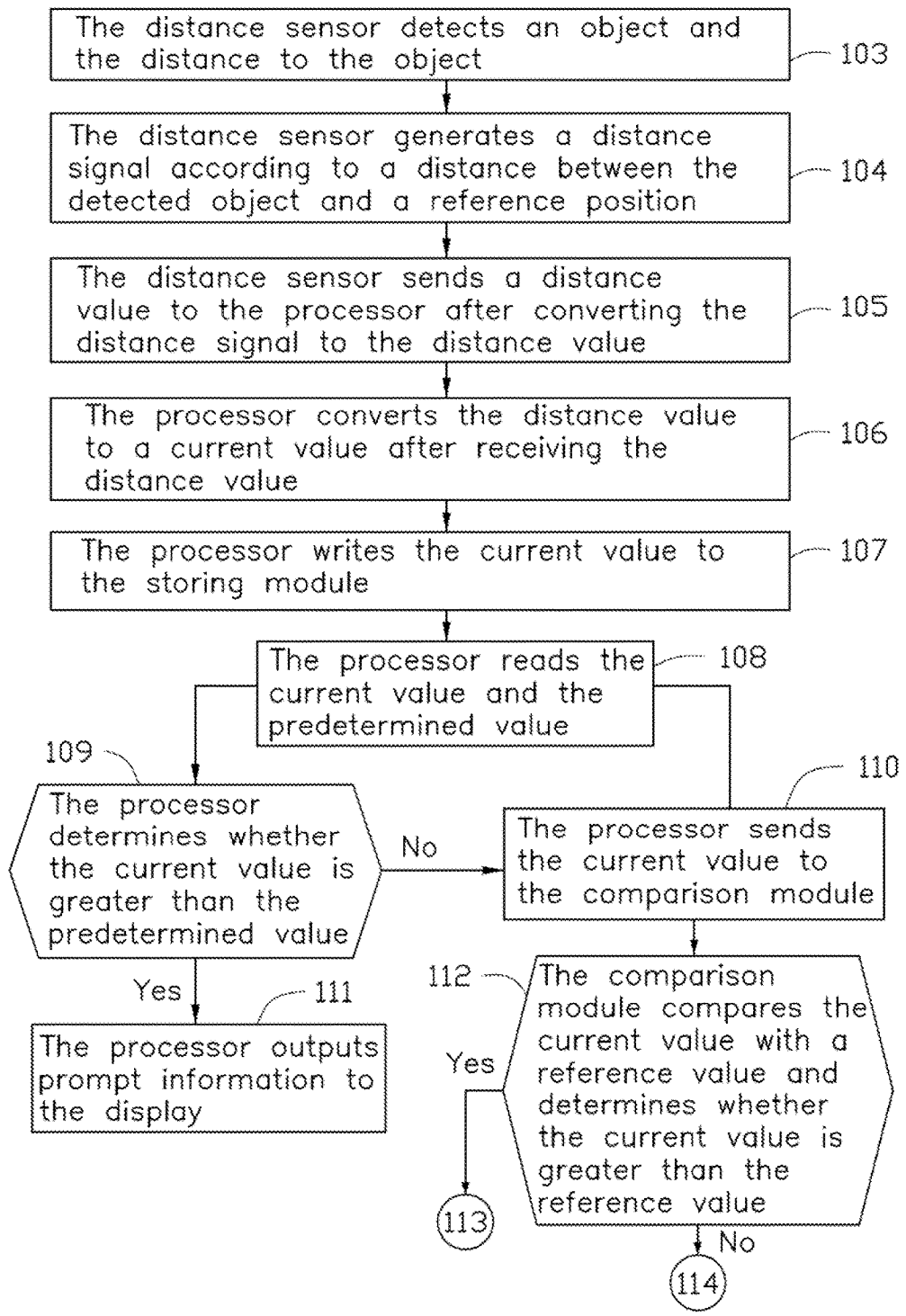
FIGS. 4 and 5 are a flowchart of a vibration prompt method.
Figure 5:
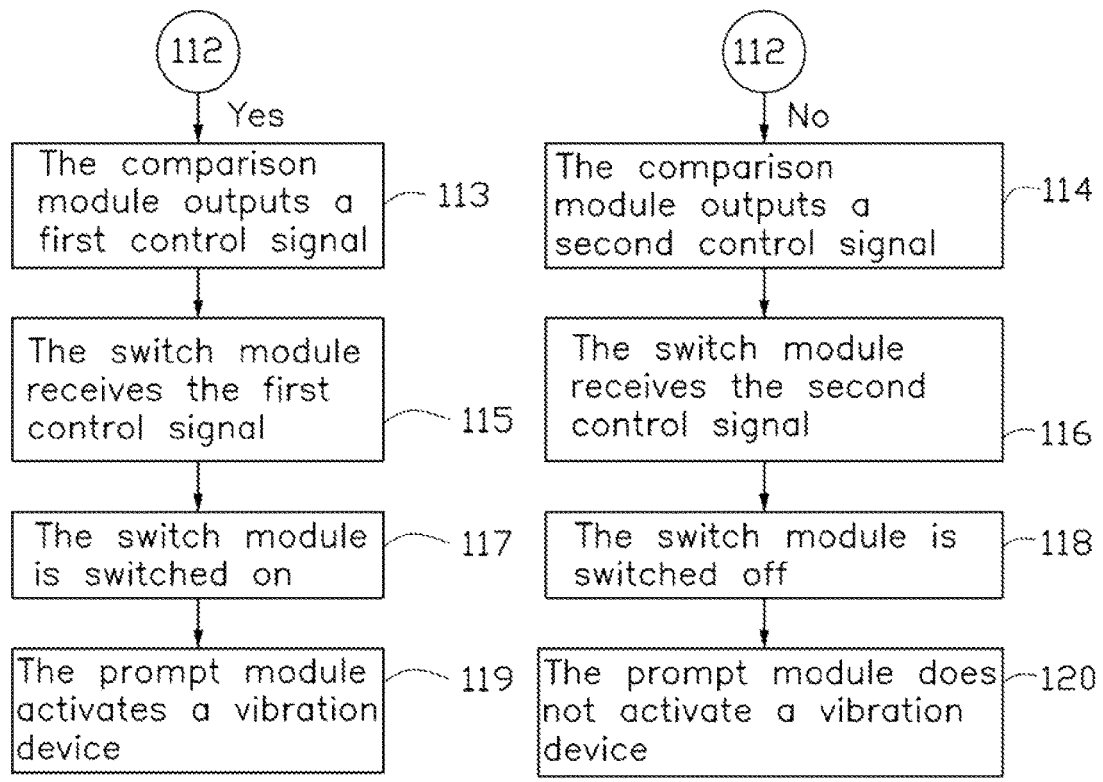

FIGS. 4 and 5 illustrates a flowchart in accordance with an example embodiment. A vibration prompt method is provided by way of example, as there are a variety of ways to carry out the method. The vibration prompt method described below can be carried out using the configurations illustrated in FIGS. 1-3, for example, and various elements of these figures are referenced in explaining communication method. Each block shown in FIGS. 4 and 5 represents one or more processes, methods, or subroutines carried out in the vibration prompt method. Furthermore, the illustrated order of blocks is by example only and the order of the blocks can change. Additional blocks may be added or fewer blocks may be utilized, without departing from this disclosure. The vibration prompt method can begin at block 103.

At block 103, the distance sensor 20 detects an object and the distance to the object.

At block 104, the distance sensor 20 generates a distance signal according to a distance between the detected object and a reference position.

At block 105, the distance sensor 20 sends a distance value to the processor 30 after converting the distance signal to the distance value.

At block 106, the processor 30 converts the distance value to a current value after receiving the distance value.

At block 107, the processor 30 writes the current value to the storing module 40.

At block 108, the processor 30 reads the current value and the predetermined value.

At block 109, the processor 30 determines whether the current value is greater than the predetermined value. If yes, the method goes to block 111, if no, the method goes to block 110.

At block 110, the processor sends the current value to the comparison module 50.

At block 111, the processor 30 outputs prompt information to the display 202.

At block 112, the comparison module 50 compares the current value with a reference value and determines whether the current value is greater than the reference value. If yes, the method goes to block 113, if no, the method goes to block 114.

At block 113, the comparison module 50 outputs a first control signal.

At block 114, the comparison module 50 outputs a second control signal.

At block 115, the switch module 60 receives the first control signal and the method goes to block 117.

At block 116, the switch module 60 receives the second control signal and the method goes to block 118.

At block 117, the switch module 60 is switched on and the method goes to block 119.

At block 118, the switch module 60 is switched off and the method goes to block 120.

At block 119, the prompt module 300 activates a vibration device.

At block 120, the prompt module 300 does not activate a vibration device.

In one embodiment, the FET is a p-channel FET, control terminal G is a gate terminal, the first connecting terminal S is a source terminal, and the second connecting terminal D is a drain terminal.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A distance detection system comprising:
   a first motor and a second motor; and
   a vibration prompt circuit comprising:
      a comparator coupled to the first motor and the second motor;
      a processor coupled to the comparator; and
      a first power supply and a second power supply supplies power to the processor;
      a field effect transistor (FET) coupled to the comparator; wherein a gate terminal of the FET is coupled to the comparator, a source terminal of the FET is coupled to the first motor, and
   a drain terminal of the FET is coupled to the second power supply; and
      a distance sensor coupled to the processor;
      wherein the distance sensor sends a distance value to the processor upon sensing a detected object and a distance to the detected object;

wherein the processor converts the distance value to a current value and sends the current value to the comparator;

wherein the comparator compares the current value with a reference value; and wherein the first motor and the second motor activates a vibration device in event the current value being greater than the reference value.

2. The distance detection system of claim 1, wherein, the field effect transistor is coupled to the first motor and the second motor, the field effect transistor is switched on upon the current value being greater than the reference value, and the first motor and the second motor makes vibration upon the field effect transistor being switched on.

3. The distance detection system of claim 2, wherein the comparator further outputs a control signal upon the current value being greater than the reference value, and the field effect transistor is switched on upon receiving the control signal.

4. The distance detection system of claim 3, wherein the control signal is a high level signal.

5. The distance detection system of claim 2, wherein the vibration prompt circuit further comprises a ROM memory coupled to the processor, the processor writes the current value to the ROM memory.

6. The distance detection system of claim 1, wherein the first power supply and the second power supply supplies power to the first motor and the second motor.

7. The distance detection system of claim 1, further comprises a display coupled to the processor, wherein the display displays prompt information upon the processor determines the current value being greater than a predetermined value.

8. The distance detection system of claim 7, wherein the processor outputs the prompt information to the display after determining the current value being greater than the predetermined value.

9. A vibration prompt circuit comprising:
a comparator couplable to a first motor and a second motor;
a processor coupled to the comparison module comparator;
a distance sensor coupled to the processor;
a first power supply and a second power supply supplies power to the first motor and the second motor and the processor; and
a field effect transistor (FET) coupled to the comparator; wherein a gate terminal of the FET is coupled to the comparator, a source terminal of the FET is coupled to the first motor, and a drain terminal of the FET is coupled to the second power supply;
wherein the distance sensor sends a distance value to the processor upon sensing a detected object and a distance to the detected object;
wherein the processor converts the distance value to a current value and send the current value to the comparator;
wherein the comparator compares the current value with a reference value; and
wherein the first motor and the second motor activates a vibration device in event the current value being greater than the reference value.

10. The vibration prompt circuit of claim 9, the vibration prompt circuit further comprises the field effect transistor, the field effect transistor is coupled to the comparator and the first motor and the second motor, the field effect transistor is switched on upon the current value being greater than the reference value, and the first motor and the second motor makes vibration upon the field effect transistor being switched on.

11. The vibration prompt circuit of claim 10, wherein the vibration prompt circuit comprises a reference circuit, a positive input end of the comparator is coupled to the processor, a reverse input end of the comparator is coupled to the reference circuit, and an output end of the comparator is coupled to the field effect transistor.

12. The vibration prompt circuit of claim 11, wherein the reference circuit comprises a first resistor and a second resistor, one end of the first resistor is coupled to one end of the second resistor and the reverse input end of the comparator, the other end of the first resistor is coupled to the first power supply, and the other end of the second resistor is grounded.

13. The vibration prompt circuit of claim 11, wherein the source terminal of the FET is coupled to the second motor.

14. The vibration prompt circuit of claim 10, wherein the comparator further outputs a control signal upon the current value being greater than the reference value, and the field effect transistor is switched on upon receiving the control signal.

15. The vibration prompt circuit of claim 14, wherein the control signal is a high level signal.

16. The vibration prompt circuit of claim 9, wherein the vibration prompt circuit further comprises a ROM memory coupled to the processor, the processor writes the current value to the ROM memory.

17. A vibration prompt method comprising:
a distance sensor sending a distance value to a processor after sensing a detected object and a distance to the detected object;
the processor converting the distance value to a current value;
the processor sending the current value to a comparator;
a first power supply and a second power supply supplying power to the processor;
a field effect transistor (FET) coupled to the comparator; wherein a gate terminal of the FET is coupled to the comparator, a source terminal of the FET is coupled to a first motor, and a drain terminal of the FET is coupled to the second power supply;
the comparator comparing the current value with a reference value; and
the first motor and a second motor activating a vibration device upon the current value being greater than the reference value.

18. The vibration prompt method of claim 17, further comprising a step of the field effect transistor being switched on upon the current value being greater than the reference value.

* * * * *